(12) United States Patent
Lemmers, Jr.

(10) Patent No.: US 8,425,372 B2
(45) Date of Patent: Apr. 23, 2013

(54) GEARED TURBOFAN EMERGENCY POWER

(75) Inventor: Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 123 days.

(21) Appl. No.: 12/835,802

(22) Filed: Jul. 14, 2010

(65) Prior Publication Data

US 2012/0015776 A1    Jan. 19, 2012

(51) Int. Cl.
*F16H 3/72* (2006.01)
*F16H 37/06* (2006.01)
*F16H 57/10* (2006.01)
*F16H 3/44* (2006.01)

(52) U.S. Cl.
USPC ............. 475/284; 475/5; 475/271; 60/39.163

(58) Field of Classification Search ............. 475/5, 271, 475/284; 415/22.1; 416/170 R; 60/39.163
See application file for complete search history.

(56) References Cited

U.S. PATENT DOCUMENTS

| | | | |
|---|---|---|---|
| 2,348,716 A | 5/1944 | Banker | |
| 3,136,499 A | 6/1964 | Kessler | |
| 4,075,910 A | 2/1978 | Davis | |
| 4,912,911 A | 4/1990 | Down | |
| 4,979,362 A | 12/1990 | Vershure, Jr. | |
| 5,106,352 A | 4/1992 | Lepelletier | |
| 5,867,979 A | 2/1999 | Newton et al. | |
| 6,467,725 B1 | 10/2002 | Coles et al. | |
| 6,503,056 B2 | 1/2003 | Eccles et al. | |
| 6,524,217 B1* | 2/2003 | Murakami et al. | 477/5 |
| 6,614,142 B1 | 9/2003 | Bonnieman et al. | |
| 6,672,049 B2 | 1/2004 | Franchet et al. | |
| 6,769,874 B2 | 8/2004 | Arel | |
| 7,077,631 B2 | 7/2006 | Eccles et al. | |
| 7,169,074 B2* | 1/2007 | Raghavan et al. | 475/5 |
| 7,294,938 B2* | 11/2007 | Miyao | 290/45 |
| 7,307,403 B2 | 12/2007 | Sarlioglu et al. | |
| 7,309,974 B2 | 12/2007 | Sarlioglu et al. | |
| 7,372,175 B2 | 5/2008 | Bouiller et al. | |
| 7,468,561 B2 | 12/2008 | Kern et al. | |
| 7,479,080 B2* | 1/2009 | Usoro | 475/5 |
| 7,507,179 B2* | 3/2009 | Gumpoltsberger | 475/285 |
| 7,605,483 B2 | 10/2009 | Kern et al. | |
| 7,805,947 B2* | 10/2010 | Moulebhar | 60/787 |
| 7,854,582 B2* | 12/2010 | Ullyott | 415/1 |
| 7,866,947 B2* | 1/2011 | Pietraszkiewicz et al. | 416/96 R |

(Continued)

FOREIGN PATENT DOCUMENTS

EP    1918564    5/2008

OTHER PUBLICATIONS

EP Search Report dated Mar. 22, 2012.

*Primary Examiner* — David D Le
*Assistant Examiner* — Colby M Hansen
(74) *Attorney, Agent, or Firm* — Carlson, Gaskey & Olds, PC

(57) ABSTRACT

A gearbox has a first rotative component and a second rotative component, the gearbox having a rotary input and a rotary output, a first brake for braking the first rotative component of the gearbox against rotation thereof, and a second brake for braking the second rotative component of the gearbox against rotation thereof. The rotary input drives the rotary output if the first brake brakes the first rotative component of the gearbox and the rotary output drives the first rotative component of the gearbox if the second brake brakes the second rotative component of the gearbox.

5 Claims, 2 Drawing Sheets

U.S. PATENT DOCUMENTS

| | | | |
|---|---|---|---|
| 2002/0183154 A1* | 12/2002 | Ziemer | 475/5 |
| 2006/0137355 A1* | 6/2006 | Welch et al. | 60/772 |
| 2006/0260323 A1 | 11/2006 | Moulebhar | |
| 2007/0202983 A1 | 8/2007 | Gumpoltsberger | |
| 2008/0110151 A1 | 5/2008 | Welch et al. | |
| 2008/0279675 A1 | 11/2008 | Ullyott | |

* cited by examiner

GEARED TURBOFAN EMERGENCY POWER

BACKGROUND OF THE INVENTION

The present disclosure relates generally to gas turbine engines and more particularly to an apparatus to selectively disengage components of a geared turbofan gas turbine engine in an emergency condition.

Aircraft geared turbofan engines, in which a geared differential connects a low pressure turbine to a fan, are known to provide good fuel economy relative to other types of aircraft gas turbine engines. A differential gives engine designers flexibility to independently optimize the fan and low pressure turbine speeds and efficiency via the differential input to output speed ratios.

SUMMARY OF THE INVENTION

According to an exemplar as shown herein, a gearbox has a first rotative component and a second rotative component, the gearbox having a rotary input and a rotary output, a first brake for braking the first rotative component of the gearbox against rotation thereof, and a second brake for braking the second rotative component of the gearbox against rotation thereof. The rotary input drives the rotary output if the first brake brakes the first rotative component of the gearbox and the rotary output drives the first component of the gearbox if the second brake brakes the second rotative component of the gearbox.

According to a further exemplar as shown herein, a gearbox having a sun gear, a planetary gear engaging with the sun gear, a carrier mounting the planetary gear thereto, and a ring gear, and a first brake for braking and unbraking the carrier for and against rotation thereof, and a second brake for braking and unbraking the sun gear for and against rotation, and a power component. The power component receives rotative output from the carrier if the second brake brakes the sun gear and does not receive rotative output from the carrier if the first brake is activated.

According to a still further exemplar as shown herein, a method includes providing rotary input to a differential gearbox output, braking a first component of the gearbox to allow the rotary input to provide the output via the gearbox, and braking rotation of a second component of the gearbox to allow the output to drive the first component of the gearbox.

These and other features of the present invention can be best understood from the following specification and drawings, the following of which is a brief description.

DETAILED DESCRIPTION OF THE PREFERRED EMBODIMENT

Figure 1:
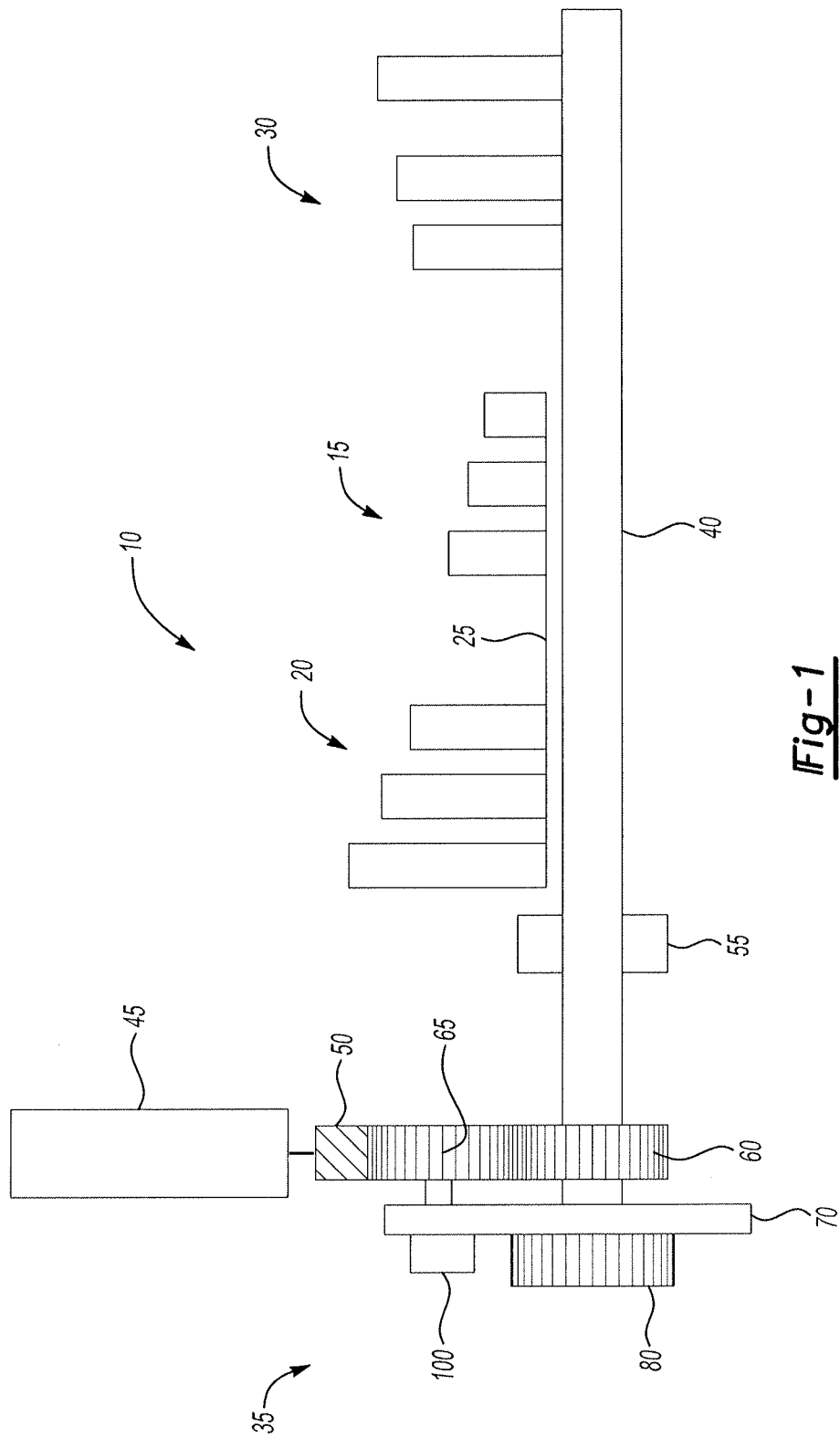
FIG. 1 includes a diagrammatic view of a low pressure turbine attaching to an epicyclic differential.

Referring now to FIG. 1, a diagrammatic view of a gas turbine engine 10 is shown. A high pressure turbine section 15 drives compressor section 20 via first shaft 25. A low pressure turbine section 30, similarly, drives (e.g., provides rotative input to) a gearbox 35 via shaft 40. The gearbox 35 drives fan 45 via ring gear 50 as is known in the art to power an aircraft (not shown). A shaft brake 55 is attached to the shaft 40.

Figure 2:
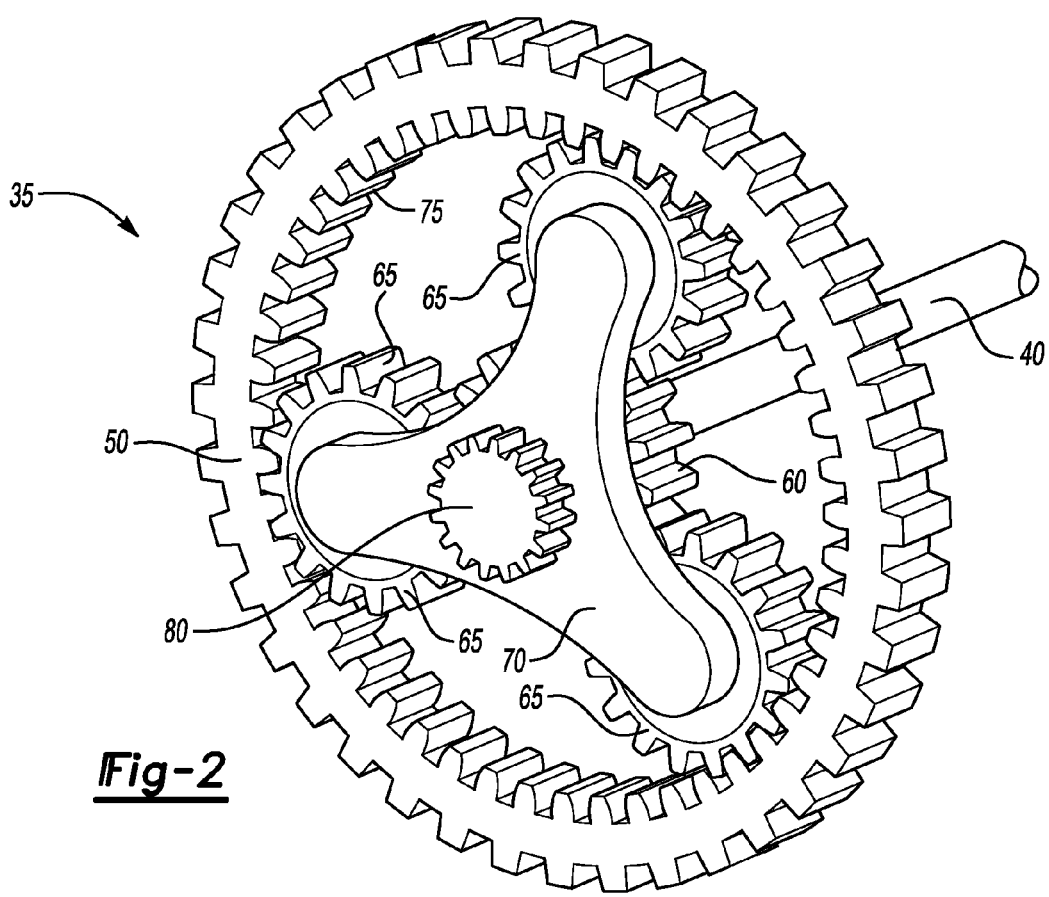
FIG. 2 is a perspective view of the epicyclic differential of FIG. 1.

Referring now to FIGS. 1 and 2, the gearbox 35 is shown. The gearbox 35, which may be epicyclic, has rotative components including an input sun gear 60 mounted for rotation with the shaft 40, a plurality of planetary gears 65 mounted in a carrier 70, and an output ring gear 50 having teeth 75 that interact with the planetary gears 65. A power gear 80 is attached to the carrier 70 for rotation therewith. The gearbox 35 allows the fan 45 at different speeds than the rotation shaft 40 speed to optimize specific fuel consumption of the gas turbine engine 10.

Figure 3:
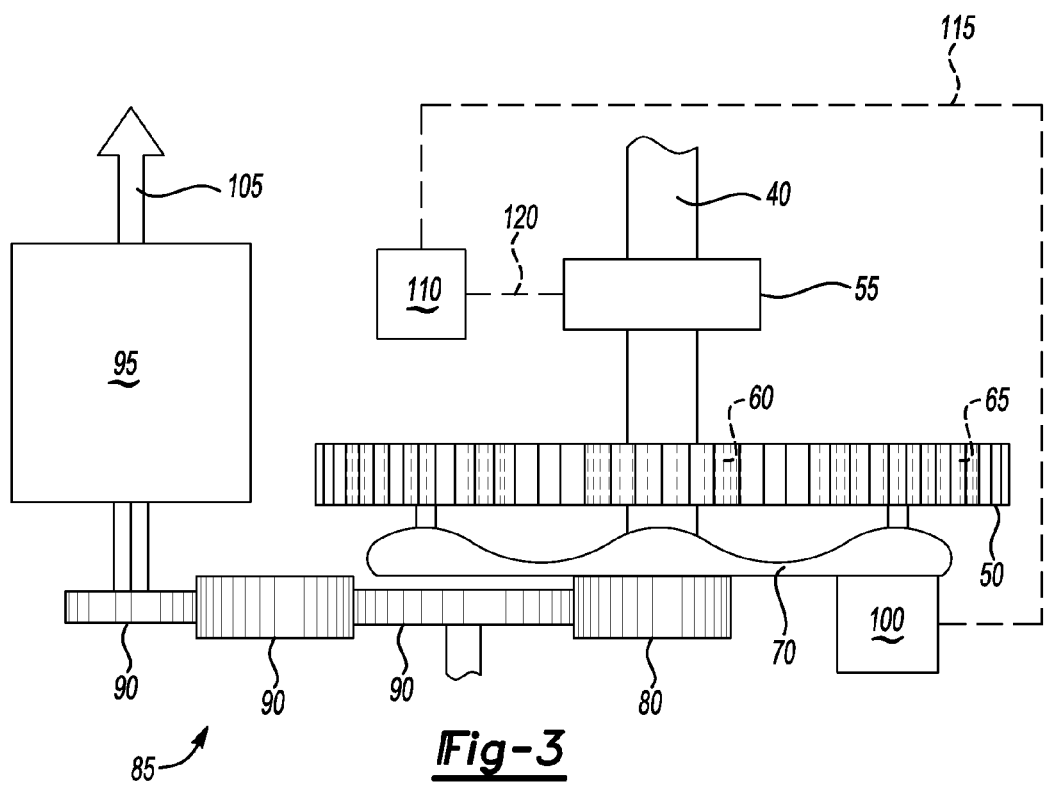
FIG. 3 is a top view of the gear train of FIG. 1.

Referring now to FIG. 3, a gear train 85 is shown. The gear train 85 is driven by power gear 80 via gears 90 to provide rotative power to a power component 95 such as a generator, a hydraulic pump or the like, or other power or drive mechanisms that may be used in an aircraft and are contemplated for use herein. The power component 95 provides power 105, usually in the form of electricity or pumped fluid for use in the aircraft (now shown). A carrier brake 100, which may be a solenoid or other similar device to hold the carrier 70 against rotation, abuts the carrier 70. The power component 95 is designed to be used if the gas turbine engine 10 is not operating and powering a separate power source (not shown).

During normal operation, a controller 110 sends a signal via line 115 to activate the carrier brake 100 and the carrier is therefore grounded or held against rotation. Shaft 40 rotates such sun gear 60 that rotate planetary gears 65 that rotate ring gear 50 which, in turn, rotates fan 45 thereabout. In this mode with the carrier 70 grounded (i.e., "braked"), the power component 95 is also grounded (i.e. producing no power) and machine stresses and wear on the power component 95 are minimized.

During an emergency, when an aircraft main engine(s) and/or an auxiliary power unit(s) may be inoperable, the failed engine(s) fan 45 may windmill, or rotate due to the forward velocity of the aircraft (not shown). A significant amount of power could be drawn from the fan 45 in this scenario to drive the power component 95 such as an emergency generator and/or hydraulic pump.

In such an emergency, the controller 110 sends a signal via line 115 to disengage the carrier brake 100 to allow the carrier to rotate and a signal via line 120 to engage the shaft brake 55 to stop the shaft 40 and sun gear 60 from rotation. In other words the sun gear 60 is grounded thereby allowing the rotating fan 45 to rotate the ring gear 50, which rotates the planetary gears 65 about the stationary sun gear 60 to rotate the carrier 70 and the power gear 80. The power gear 80, in turn rotates the gears 90 to power the power component 95 to provide power 105 to the aircraft (not shown).

By braking the sun gear/engine shaft during an emergency reduces parasitic losses; i.e. power can thus be extracted from the power component. One should also note that if the gas turbine engine 10 is inoperable, its mass and parasitic losses make the shaft 40 difficult to turn thereby providing a braking force on the sun gear reducing the need for a shaft brake 55. In other words, the mass and parasitic losses of the engine essentially provides a grounding force against rotation of the sun gear 60 thereby allowing a rotative force provided by blades 45 to power the power component 95 even if there is some rotation of the shaft 40.

Grounding or ungrounding of the epicyclic differential members, by a carrier brake 100 and/or the shaft brake 55, could be accommodated via any number of clutching methods such as, for example band brakes, cone brakes, face clutches, etc.

Although a combination of features is shown in the illustrated examples, not all of them need to be combined to realize the benefits of various embodiments of this disclosure.

In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A geared turbofan emergency power apparatus comprising:
   a planetary gear set having a first, second and third rotative component;
   a turbine shaft from a gas turbine engine integrally connected as a rotary input to the second rotative component;
   a rotary ouput;
   a fan integrally connected with the third rotative component;
   a first brake for braking said first rotative component against rotation thereof;
   a second brake for braking said second rotative component against rotation thereof; and
   wherein said rotary input drives said rotary output if said first brake brakes said first rotative component; and
   wherein said rotary output drives the first rotative component which thereby drives a power generating component when the second brake brakes said second rotative component in an emergency condition.

2. The geared turbofan emergency power apparatus as set forth in claim 1, wherein said power generating component is an electrical power generating component.

3. The geared turbofan emergency power apparatus as set forth in claim 1, wherein the power generating component is a pump for fluid.

4. The geared turbofan emergency power apparatus as set forth in claim 1, wherein the emergency is the gas turbine engine becoming inoperable.

5. The geared turbo fan emergency power apparatus as set forth in claim 4, wherein said rotary output is driven to rotate said first rotative component by said fan windmilling when the gas turbine engine is operable.

* * * * *